Patented Jan. 17, 1950

2,494,585

UNITED STATES PATENT OFFICE 2,494,585

OLEFINIC POLYMERIZATION IN THE PRESENCE OF FLUORINE COMPOUNDS

John S. Saylor, Jr., Reading, Pa., assignor to Standard Oil Development Company, a corporation of Delaware No Drawing. Application September 30, 1944, Serial No. 556,658

4 Claims. (Cl. 260—85.3)

This invention relates to the low temperature polymerization of olefinic materials and relates particularly to the polymerization at low temperature in the presence of a fugitive solid to provide a grinding action, such as a pulverizing refrigerant; and a diluent.

This application is a continuation-in-part of my co-pending application Serial No. 502,438, filed September 15, 1943, now abandoned, for "Improved low temperature polymerization process."

It has been found possible to polymerize olefins such as isobutylene in admixture with a polyolefin such as butadiene or isoprene or the like at temperatures ranging from −20° C. to −100° C. or even as low as −164° C. by the application thereto of a Friedel-Crafts catalyst, preferably in solution in a low-freezing, non-complex-forming solvent to yield a highly valuable synthetic substitute for rubber. However, the reaction is difficult to control and difficult to conduct because of the thick, heavy, gummy character of the polymer both at the low temperature of polymerization and at room temperature; and great difficulty has been encountered in developing a process which was both simple to operate and at the same time yielded a high grade polymer.

The present invention is based upon the discovery that if the polymerization is conducted in a kneader in the presence of a fugitive solid, a solid refrigerant such as solid carbon dioxide, the polymer is broken up into fragments by the grinding action between the blades and the fugitive solid, which fragments can be handled with reasonable satisfaction; and the further discovery that if the polymerization is conducted both in the presence of a solid refrigerant to break up the polymers and a diluent such as methyl chloride or liquid propane or the like to maintain the slurry, the new and unexpected phenomenon appears that when the resulting polymer is cured, it gives a very much higher "pure gum" tensile strength, and better physical properties generally than are otherwise obtainable.

Thus, the invention provides a new and useful combination of members utilizing a kneader as the reaction vessel; utilizing the interaction between the kneader blades and a solid refrigerant or volatile solid in the kneader upon the olefinic polymerizable material; and a diluent by which a very much superior polymer is obtained because of the improved polymerization conditions, and the fact that the polymer is maintained as a fine grained slurry during the entire polymerization reaction. Other objects and details of the invention will be apparent from the following description.

In practicing the invention, a kneader of the general character of the so-called "Werner-Pfleiderer" type is used. This kneader is charged with a fugitive solid which is preferably a solid refrigerant, such as solid carbon dioxide or other low melting solid which may be itself a refrigerant or may melt or volatilize at a temperature near to the polymerization temperature. Such a substance as solid methyl chloride, having a melting point at −97.6° C., is particularly useful, since when it melts it supplies additional portions of inert diluent. The methyl chloride may be the refrigerant as well as the inert diluent and the grinding solid; or liquid ethylene either in a refrigerating jacket or in admixture with the polymerization reactants, may be used. Similarly, ethyl chloride, having a melting point at −138.7° C., is equally satisfactorily usable, although in this instance it is its own refrigerant; or a refrigerant such as a mixture of liquid methane and liquid ethylene may be used. Similarly, propyl chloride, having a melting point at −117° C., may be used. Other useful substances are shown in the following table:

| Name | Formula | M. Pt., °C. | B. Pt., °C. |
|---|---|---|---|
| Methyl chloride | $CH_3Cl$ | −97.6 | −23.7 |
| Ethyl chloride | $CH_3CH_2Cl$ | −138.7 | 12.2 |
| Propyl chloride | $CH_3CH_2CH_2Cl$ | −117.0 | 34.8 |
| Dichlorodifluoromethane (Freon-12) | $CCl_2F_2$ | −155.0 | −22 |
| Trichloromonofluoromethane (Freon-11) | $CCl_3F$ | −88.0 | 74 |
| Dichloromonofluoromethane (Freon-21) | $CHCl_2F$ | −127.0 | 48 |
| Dichlorotetrafluoroethane (Freon-114) | $C_2Cl_2F_4$ | −105.5 | |
| Trichlorethylene | $Cl_2C{:}CHCl$ | −73.0 | 86.9 |
| Methylene chloride | $CH_2Cl_2$ | −96.7 | 40.7 |
| Chloroform | $CHCl_3$ | −63.5 | 61.15 |

These substances are representative of a considerable number of mono- or poly-halogenated alkanes which are satisfactory for the purposes of the present invention. In addition, solid carbon dioxide is highly advantageous, even though it volatilizes and leaves behind no residue to increase the amount of diluent for the formation of a slurry. Also, carbon disulfide having a freezing point at —108° C., is particularly useful, as are several of its analogues and homologues.

It may be noted that the solubility relationships between these substances, when liquid, and the polymer vary considerably according to the specific substance chosen. Ethyl chloride shows a relatively low solubility for the polymer and markedly promotes the production of a fine grained slurry. Carbon disulfide shows a relatively high solubility for the polymer, and if present in sufficient quantity, may be caused to yield a substantially complete solution of polymer. By starting with the kneader nearly free from liquid carbon disulfide but filled with solid carbon disulfide, the polymerization proceeds first under the grinding effect of the solid polymer, especially if there is a liquid refrigerant having a boiling point below the freezing point of the carbon disulfide; then when the polymerization is nearly complete, and the carbon disulfide begins to melt, the polymer goes into solution quite rapidly in the melted portion of the carbon disulfide under the grinding action of the residual solid carbon disulfide.

It may be noted that the fluorine compounds show a lower solubility for the polymer than do most of the other halides, some of the fluorides showing almost zero solvent power for both the polymerization mixture and the polymer. In the presence of a solid, whether a solid halogenated fluoroalkane, or solid carbon dioxide with the liquid halogenated fluoroalkane, an excellent emulsion of the olefinic monomer mixture in the liquid fluorinated alkane may be formed, which is particularly advantageous for polymerization, yielding a fine grained slurry, to an emulsion, of polymer in the fluorinated alkane liquid. The fact that many of the fluorine containing alkyl compounds have boiling points above room temperature, and an extremely low solvent power for and solubility in the polymer, permits of a ready separation of the solid polymer from the slurry or emulsion in the fluorinated alkane, at room temperature by a relatively simple filtration procedure. In bringing the temperature from polymerization temperature to room temperature, practically all of the polymerization mixture substances present volatilize away from the polymer substantially completely, leaving behind enough liquid fluorinated alkane to maintain the suspension, from which the polymer is easily recovered by a filtration procedure followed by washing with water for milling at an elevated temperature, to remove the last of the liquid material.

For the polymerization procedure, the kneader is cooled to a polymerization temperature ranging from —20° C. down to —164° C., depending upon the refrigerant used. Solid carbon dioxide sets a temperature of —78° C.; solid carbon dioxide in the presence of liquid ethane as a refrigerant sets a temperature of approximately —98° C. Solid carbon dioxide in the presence of liquid methane sets a temperature of approximately —160° C. To the cold kneader there is then added the desired polymerizable olefinic material.

This material preferably consists of isobutylene but in some instances may consist of a higher isoolefin such as 2-methyl, butene-1 or 2-methyl, pentene-1 or 2-methyl, hexene-1 or the like; in admixture with a polyolefin such as butadiene or isoprene or piperylene or dimethallyl (also known as diisobutylenyl) or myrcene or the like. These are the preferred polyolefins but substantially any of the polyolefins having from 4 to 12 or 14 carbon atoms per molecule are useful. The isoolefin is preferably present in major proportion and the polyolefin in minor proportion; the best proportions lying within the range from 70 parts to 99.5 parts of the isoolefin with 30 parts to 0.5 part of the polyolefin.

The polymerization is conducted by applying to the olefinic material in the kneader a Friedel-Crafts catalyst, preferably in solution in a low freezing non-complex forming solvent. The preferred catalyst material is aluminum chloride in solution in ethyl or methyl chloride or carbon disulfide. However, substantially any of the Friedel-Crafts catalysts disclosed by N. O. Calloway in his article on "The Friedel-Crafts synthesis" printed in the issue of "Chemical Reviews" published for the American Chemical Society at Baltimore in 1935, in volume XVII, No. 3, the article beginning on page 327, the list being particularly well shown on page 375, may be used. If boron trifluoride is used, it is of course gaseous and is readily bubbled through the polymerization mixture. Alternatively, boron trifluoride and all of the other catalysts may be dissolved in the solvent. For the solvent substantially any of the mono or poly alkyl halides which have freezing points below 0° C., thereby having "low freezing" with respect to water, may be used. Alternatively, carbon disulfide and its analogues and homologues may be used, all of these solvents being characterized by their freedom from any tendency to form a complex with the Friedel-Crafts halide, as shown by the fact that the solvent can be volatilized away from the solute substantially completely without any significant change in boiling point. The catalyst is preferably delivered to the cold polymerization mixture in the form of a fine spray applied to the surface of the rapidly stirred material under the influence of the kneader blades and the mass of solid refrigerant. When the polymerization reaction has reached the desired stage, which may be from 50% to 95% or even 100%, polymerization of the isoolefin and polyolefin, the material is removed from the kneader and brought up to room temperature; preferably by dumping the kneader contents into warm water or warm alkali solution or warm alcohol, and the solid polymer is separated from the liquid, worked on the hot mill and otherwise purified as desired.

The material may then be compounded with such substances as sulfur, zinc oxide, stearic acid, carbon black and the like and cured at appropriate temperatures and times.

The resulting polymer shows an excellent tensile strength ranging from 1800 pounds to 4500 pounds per square inch; an elongation at break of from 300% to 1200%; good processing characteristics for such operations as milling, calendering, extruding and the like; a very desirably low heat build-up under rapid flexure; a high abrasion and flexure resistance and many other very valuable physical properties. The low heat build-up characteristic of this material is well shown in the data chart presented as a part of Example 1. This low heat build-up shows the specially valuable properties of this material for use with tires, tubes and the like where heating from rapid flexure is an important item in the use of the polymer.

EXAMPLE 1

A series of polymerizations were conducted using different amounts of inert diluent and different concentrations of catalyst as shown in Table 1, the amount of methyl chloride being in one instance 63.5% of the amount of mixed reactant olefins, and in another the amount of methyl chloride being 167% of the amount of reactant olefins, one pair of polymerizations using 0.35% aluminum chloride solution in methyl chloride as catalyst and another pair using 0.69% aluminum chloride in methyl chloride as catalyst. These several polymerizations were conducted as follows:

The kneader was cooled by solid $CO_2$ to a temperature well below $-60°$ C. To the kneader there were added 75 parts by weight of solid $CO_2$ as refrigerant and the kneader was allowed to operate until the solid refrigerant was broken up into small chunks. Approximately 10 parts of a mixture of 97% of isobutylene of 98% purity with 3% of isoprene of 96% purity was then added to the kneader with the blades in operation. There were then added 16 parts by weight of methyl chloride, and the mixing of the material was then conducted in the presence of the methyl chloride. When a thoroughly homogeneous mixture had been obtained, approximately 3.0 parts of a catalyst consisting of approximately 0.75% of aluminum chloride in methyl chloride was added through a spray nozzle under pressure to the surface of the reaction mixture, the addition of catalyst occupying approximately 6 minutes in time (although in other instances the time of addition was varied without change in the reaction between 2 minutes and 8 minutes). It was noted that immediately after the catalyst addition was begun, the liquid became translucent, forming a milk white suspension of very fine polymer particles. After 2 or 3 minutes, the reaction suddenly became much more vigorous, as was evidenced by a violent bubbling in the mixture (from volatilized $CO_2$), and continued for about 5 minutes after the catalyst injection had been completed. The kneader blades were continued in operation during the entire time of the addition of the catalyst, and for a period of approximately 20 minutes thereafter. At the close of this time, the contents of the kneader were in the form of a slurry of polymer particles together with residual quantities of solid carbon dioxide in the methyl chloride. This liquid slurry was then dumped into warm water to volatilize out the residual solid $CO_2$ and the methyl chloride, and at the same time to quench the catalyst. The resulting polymer remained in the form of a moderately fine grained slurry in the water. It was readily separated from the water by a strainer and was then transferred to an open roll mill.

On the mill, the solid polymer was washed with clear water to remove as much as possible of the catalyst breakdown product and the alkylation material and was then compounded according to the following recipe:

|  | Regular Loaded Recipe | Pure Gum Recipe |
|---|---|---|
|  | Parts | Parts |
| Polymer | 100 | 100 |
| Carbon Black | 50 | 10 |
| Zinc Oxide | 5 | 5 |
| Stearic acid | 3 | 3 |
| Sulfur | 2 | 1.5 |
| Tuads (tetra methyl thiuram disulfide) | 1 | 1.0 |
| Captax | 0.5 | 0 |

The compound polymer was then cured in a mold under heat and pressure to obtain a cured specimen which, upon test, showed very interesting properties.

A comparison of the properties shown by polymer of this type prepared in the kneader in the absence of diluent and in the kneader in the presence of diluent is given in the following Table A.

TABLE A
*Summary sheet of evaluations for diluent and non-diluent kneader batch stocks*

| Evaluations | Typical Non-Diluent Kneader Batch Stocks (B-2.93 Feed) | | Kneader Batch Diluent Stocks | | | |
|---|---|---|---|---|---|---|
| | | | B-2.81 Feed, Catalyst, 0.35 gm. $AlCl_3$ in MeCl | | B-2.81 Feed, Catalyst, 0.69 gm. $AlCl_3$/MeCl | |
| | (0.325 Catalyst) Column 1 | (0.72 Catalyst) Column 2 | (0.635 Diluent Ratio) Column 3 | (1.67 Diluent Ratio) Column 4 | (0.635 Diluent Ratio) Column 5 | (1.67 Diluent Ratio) Column 6 |
| Yield, Percent by Weight | 88.4 | 90.3 | 63.3 | 69.3 | 71.3 | 61.5 |
| Regular Evaluations (60 Cure) (50 pts. carbon black): | | | | | | |
| Mooney | 37 | 33 | 28 | 26 | 25 | 23 |
| Tensile | 2,285 | 2,070 | 2,215 | 2,360 | 2,165 | 2,315 |
| Modulus | 1,080 | 785 | 505 | 670 | 500 | 720 |
| Elongation | 565 | 665 | 740 | 675 | 750 | 655 |
| Pure Gum Tensile (10 parts carbon black): | | | | | | |
| 20' cure | 1,380 | 1,065 | 1,950 | 2,110 | 1,805 | 1,785 |
| 40' cure | 1,295 | 790 | 850 | 2,250 | 1,005 | 1,720 |
| 60' cure | 965 | 675 | 930 | 2,050 | 1,030 | 1,000 |
| Extrusion: | | | | | | |
| Inches/Min | 30 | 32.5 | 57 | 64 | 56 | 72.8 |
| Grams/Min | 78 | 78.6 | 128 | 154 | 121 | 137 |
| Appearance | Intermediate | Rough to Intermediate | Smooth | Smooth | Smooth | Smooth |
| Rebound: | | | | | | |
| Cure (Min.) | 60 | 40 | 60 | 60 | 60 | 60 |
| % at Room Temp | 26.7 | 26.7 | 28.3 | 27.5 | 27.8 | 27.8 |
| % at 100° C | | | 58.8 | 58.5 | 58.8 | 59.6 |
| Flexometer: | | | | | | |
| Shore Durometer | 56.6 | 52.5 | 58 | 59 | 64 | 69 |
| Temp. Rise, °C | 45.3 | 56.0 | 34.5 | 32.5 | 32.8 | 33.7 |

NOTE: Diluent ratios referred to in columns 3 to 6 are ratios of methyl chloride to isoprene-isobutylene feed, weight basis.

In this table the first two columns of figures under "non-diluent kneader" show the character of results obtained in the absence of a diluent such as ethyl or methyl chloride; whereas the last four columns show the results obtainable with varying the diluent ratios and varying catalyst concentrations.

These results show the excellent quality of the polymer as prepared in some of its physical properties.

EXAMPLE 2

A polymerization was conducted as in Example 1 except that after charging the reactor-kneader with 75 parts by weight of solid $CO_2$ there was added 10 parts by weight of a mixture of 95% of isobutylene of a 98% purity and 5% of isoprene of 96% purity together with approximately 16 parts by weight of methyl chloride. The polymerization was conducted as in Example 1 to yield approximately 55% of the reactant olefinic material as a solid polymer. Upon compounding, according to recipes in Example 1, curing and evaluating the cured product, it was found to show a substantially higher modulus; approximately 1000 instead of the 500 to 720 obtained in Example 1. In addition to the higher modulus, this polymer shows a lower heat build-up, a higher rebound, higher tensile strengths, especially when compounded according to the so-called "pure gum" recipe, and a higher Mooney hardness.

EXAMPLE 3

A polymerization was conducted as in Example 1 but utilizing for the olefinic reactant material a mixture containing 98.5% of isobutylene of a 98% purity and 1.5% of isoprene of 96% purity. This material polymerized equally well and when compounded according to the recipes in Example 1 it cured satisfactorily; also, the yield was close to 90% of the reactant olefins. However, the physical properties were all considerably lower than those shown in the chart in Example 1.

It is well known that the lower the temperature of polymerization, the higher the molecular weight, and the more satisfactory the polymerization reaction. Accordingly, a polymerization was conducted using solid methyl chloride as the refrigerant and grinding material.

In conducting this polymerization, the kneader was cooled by solid methyl chloride to a temperature well below −90° C. Approximately 50 parts by weight of solid methyl chloride were added to the cold kneader, and approximately 10 parts by weight of a mixture of 97% of isobutylene of 98% purity with 3% of isoprene of 96% purity was added to the kneader containing a substantial amount of liquid methyl chloride, the amount of liquid methyl chloride being approximately 15 parts by weight. The reaction was then continued by the addition of approximately 3 parts by weight of a catalyst solution consisting of approximately 0.75% of aluminum chloride in methyl chloride, the catalyst being mixed rapidly with the olefinic material in the kneader. The polymerization proceeded rapidly as in Example 1, a substantial portion of the solid methyl chloride being melted by the heat of reaction to yield a more dilute slurry. The resulting polymer was separated from the slurry, brought up to room temperature, compounded according to the recipes in Example 1 and evaluated to yield the following table:

|  | Solid Methyl Chloride | (Solid $CO_2$) |
|---|---|---|
| Mooney (plasticity) | 35–45 | (23) |
| Tensile strength | 2,800–3,500 | (2,300) |
| Pure gum tensile | 2,200–2,700 | (1,785) |
| Modulus | 720 | (720) |
| Elongation | 800 | (655) |
| Yield | 61.5 | (61.5) |

It will be noted that the material is definitely harder, according to the Mooney plasticity test, that the tensile strength is considerably higher, that the modulus is unchanged, the elongation at break considerably increased and the yield approximately the same. It should also be noted that the lower temperature obtainable with solid methyl chloride yields an improved rebound, lower heat build-up and better flexure and abrasion properties.

It may be noted that carbon dioxide is particularly convenient as an embodiment of this invention because of the fact that it sublimes, and leaves behind no residue; and, in addition, it is non-poisonous and is without effect upon the polymerization reaction. The halogenated alkanes, as above pointed out, are also useful in the reaction even though they do not sublime, but merely melt in the course of the reaction, to furnish additional quantities of diluent, thereby permitting the initiation of the reaction with a minimum quantity of auxiliary diluent, a substantial portion to a major portion of the diluent being provided by the melting of the grinding solid.

It may further be noted that the reaction requires the use of a material which is solid at the polymerization temperature and which is violatile below room temperature, or at a temperature only slightly above room temperature, preferably volatile below 100° F. in order to permit of the complete removal of the refrigerant and diluent from the polymer without thermal injury or overheating of the polymer (although in some instances the polymer may be dissolved in a light volatile solvent other than the reaction diluent and precipitated therefrom by alcohol) to insure freedom from undesired substances such as impurities or residual traces of the diluent.

The above outlined embodiments of the invention utilize a diluent which enhances to as great an extent as possible, the production of a slurry of the polymer. However, the reaction proceeds in a somewhat analogous form when other diluents are used. Particularly with carbon disulfide the polymer is obtained at the end of the reaction in a solution in carbon disulfide. For this embodiment the kneader is prepared as above outlined, cooled with the solid material which may be solid carbon disulfide which freezes at −108.6° C., with or without additional carbon disulfide as diluent. The polymerization mixture, as above outlined, is then added to the kneader, the kneader put into operation and the catalyst solution added as above described. The resulting polymer does not form a slurry but forms a solution in the carbon disulfide. When the reaction has reached the desired stage (which may be at a point at which from 50% to 90% or even 100% of the polymerizable material is polymerized), the reaction mixture may be dumped into warm water as described, or the reaction mixture may be brought up to room temperature through a heat exchanger and the polymer precipitated from the solution in the carbon disulfide by the addition of a convenient alcohol or glycol, methyl or ethyl alcohol or propyl alcohol or ethylene glycol or glycerine or the like being suitable. In this instance also the powerful grinding and stirring action of the chunks of solid carbon disulfide under the drive of the kneader blade results in a highly advantageous polymerization reaction to yield a superior polymer.

This reaction proceeds quite well with other homologs of carbon disulfide.

The reaction also proceeds quite satisfactorily with the lower hydrocarbons. For this purpose such hydrocarbons as heptane, freezing at $-90.5°$ C. boiling at $+98.5°$ C., are advantageous. Alternatively, propane, freezing at $-189.9°$ C. or preferably butane freezing at $-135°$ C. or even better, pentane freezing at $-131°$ C. may also be used. These substances are chilled to the freezing point, and the solid added to the kneader as described for solid carbon dioxide. The polymerization mixture is then added to the solid hydrocarbon in the kneader and the polymerization is then conducted by adding the catalyst as above described. In this instance also a slurry is formed which is satisfactory, and the resulting polymer is of excellent quality. However, the polymer shows a definitely much higher solubility in these hydrocarbons than it does in the alkyl halides and accordingly the slurry is less grainy in character and contains much more of the solvent.

As will be obvious from the description in the above examples, the essence of the invention is the polymerization of olefinic material at a low temperature in the presence of an inert diluent and a solid material which gives a substantial grinding action upon the olefinic material and polymer during the formation of the polymer. Grinding action is essential to prevent unreacted catalyst from being occluded in polymer, since occluded catalyst will degenerate the polymer quality.

Thus, the invention provides a polymerization procedure by which the polymerization is conducted in the presence of a grinding material which serves simultaneously as a refrigerant, and a diluent to maintain the slurry resulting from the grinding material to yield a slurry of polymer which is particularly easy to handle and yields a superior polymer.

While there are above disclosed but a limited number of embodiments of the process of the invention, it is possible to produce still other embodiments without departing from the inventive concept herein disclosed and it is therefore desired that only such limitations be imposed upon the appended claims as are stated therein or required by the prior art.

The invention claimed is:

1. A process for the copolymerization of an isoolefinic hydrocarbon of 4 to 7 carbon atoms in the molecule with a polyolefinic hydrocarbon of 4 to 14 carbon atoms in the molecule which comprises kneading the mixture of the isoolefin and the polyolefin at a temperature between $-20°$ C. and $-164°$ C. in the presence of a Friedel-Crafts catalyst and a chlorofluoro alkane which is solid at the reaction temperature and volatile below $100°$ F.

2. A process for the copolymerization of a mixture of a major proportion of isobutylene and a minor proportion of isoprene which comprises kneading the mixture of isobutylene and isoprene at a temperature below $-100°$ C. in the presence of solid dichlorotetrafluoroethane and a Friedel-Crafts catalyst.

3. A process for the copolymerization of a mixture of a major proportion of isobutylene and a minor proportion of isoprene which comprises kneading the mixture of isobutylene and isoprene at a temperature below $-155°$ C. in the presence of solid dichlorodifluoromethane and a Friedel-Crafts catalyst.

4. A process for the copolymerization of a mixture of 97% isobutylene and 3% isoprene which comprises kneading the mixture of isobutylene and isoprene at a temperature below $-100°$ C. in the presence of solid dichlorotetrafluoroethane and aluminum chloride dissolved in an organic solvent which does not form a complex with said aluminum chloride.

JOHN S. SAYLOR, JR.

REFERENCES CITED

The following references are of record in the file of this patent:

UNITED STATES PATENTS

| Number | Name | Date |
|---|---|---|
| 2,243,470 | Morway | May 27, 1941 |
| 2,276,893 | Thomas | Mar. 17, 1942 |

FOREIGN PATENTS

| Number | Country | Date |
|---|---|---|
| 543,420 | Great Britain | Feb. 25, 1942 |